May 14, 1929.  J. F. LAWSON  1,712,507
WELDING PIPES
Filed July 27, 1925    2 Sheets-Sheet 1
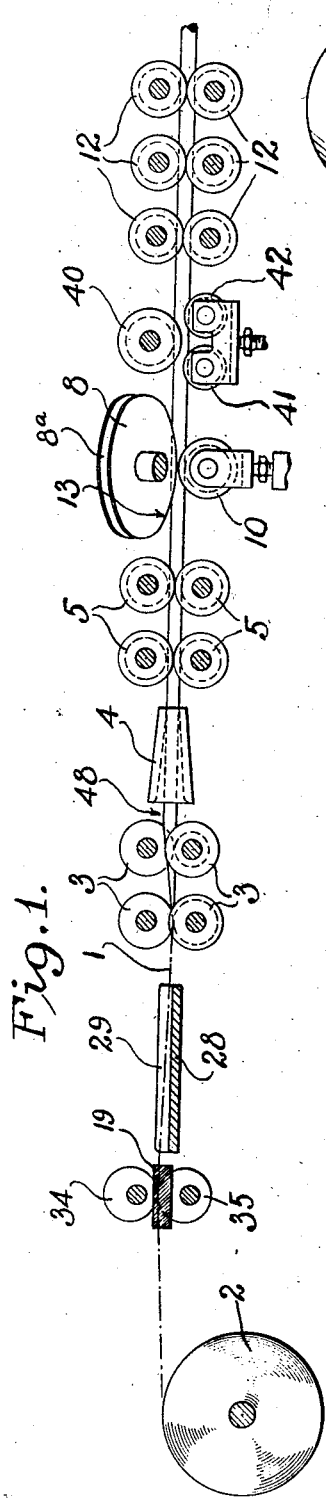
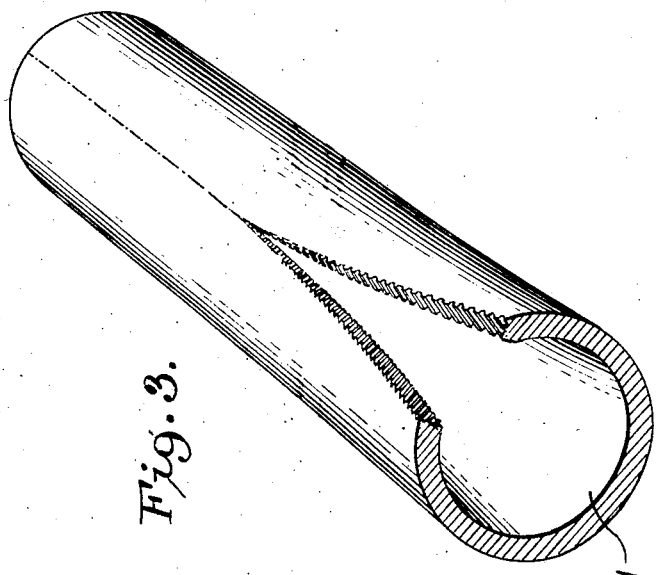
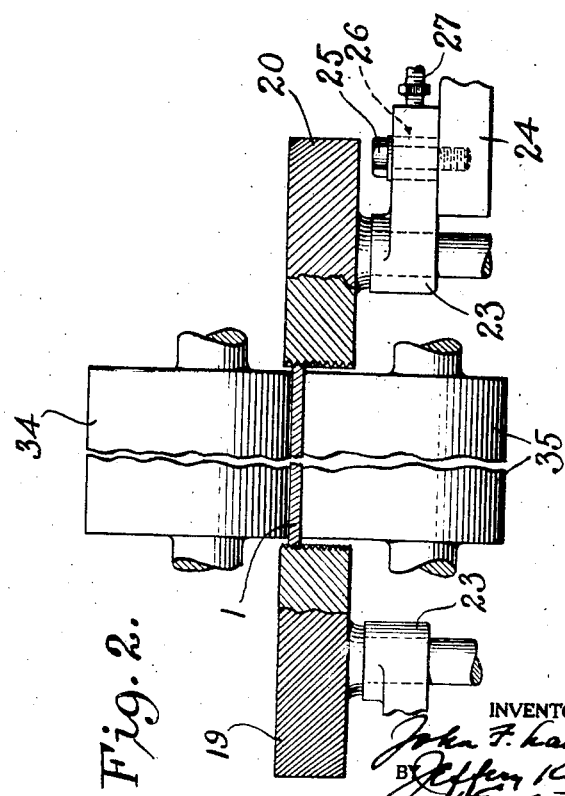

May 14, 1929.    J. F. LAWSON    1,712,507
WELDING PIPES
Filed July 27, 1925    2 Sheets-Sheet 2
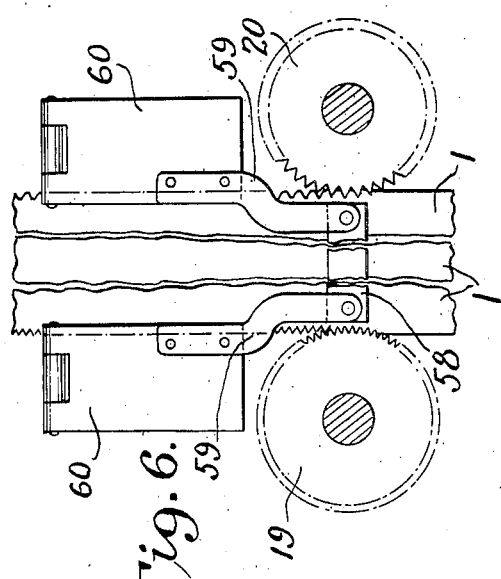
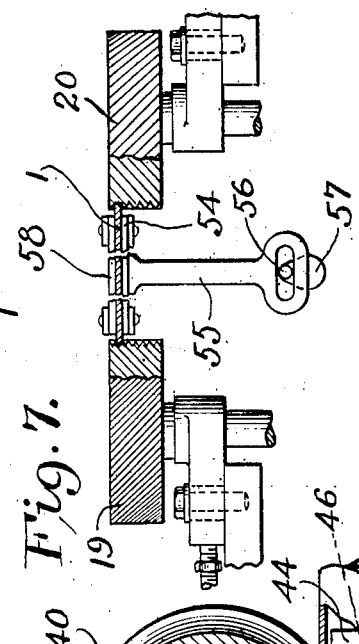
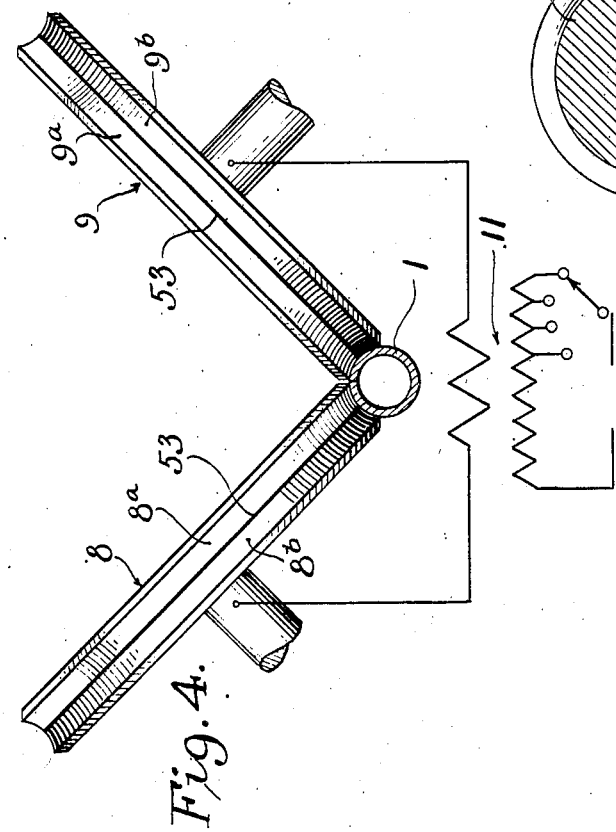
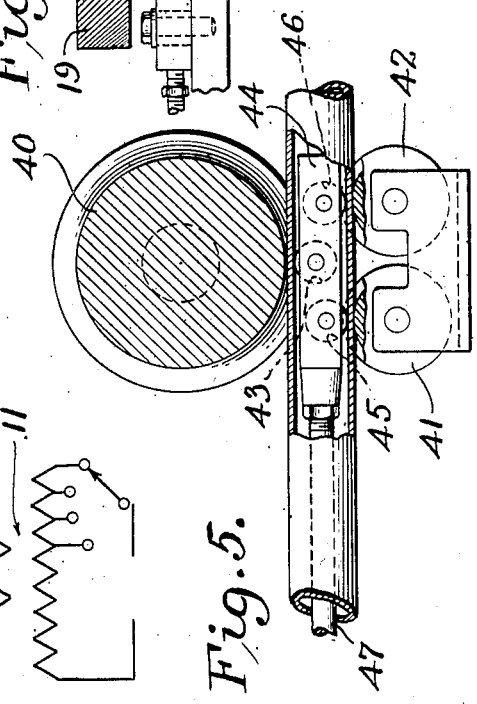
INVENTOR
John F. Lawson
BY
ATTORNEY Patented May 14, 1929.

1,712,507

UNITED STATES PATENT OFFICE.

JOHN F. LAWSON, OF BROOKLYN, NEW YORK, ASSIGNOR, BY MESNE ASSIGNMENTS, TO STEEL AND TUBES, INC., A CORPORATION OF OHIO.

WELDING PIPES.

Application filed July 27, 1925. Serial No. 46,211.

My invention relates to the electric resistance welding of long seams, such as are welded progressively beginning at one end, where the surfaces to be joined are serrated or treated in an analogous manner prior to the actual welding. The invention is especially intended for (but is not necessarily limited in its application to) the manufacture of pipes or tubes by electric-resistance butt-welding.

The object of my invention is to improve both the process and the machines.

To this end, I propose to provide corresponding lengths of the two surfaces to be joined, with unequal numbers of indentations (or, correlatively, projections), and to make the working face of the tool which makes the indentations (or produces the projections) wider than the surface to be treated and move the stock and tool relative to each other so that the stock crosses the face of the tool as the stock travels over it. The surfaces can be treated in various suitable ways but preferably I slot, ridge or indent one or both surfaces by rolling tools such as milling or nurling wheels, that is to say, by the use of peripherally grooved or indented rolls running against the surfaces to be joined and leaving their impress therein. These tools may be mounted on and made a part of the welding machine ahead of the welding station, in which event clean, bright metal is presented for welding. The grooves or the ridges or points between them are preferably closely spaced; in butt welding I find that about 20 to 30 serrations to the inch are satisfactory for 18 and 20 gauge mild steel stock, the grooves being in the neighborhood of 1/64th inch in depth. My preferred practice is to groove or produce ridges of opposite slope on the two surfaces, so that points of contact are produced by the crossing of ridges and the surfaces are progressively brought together initially at a series of points. The cuts, or grooves, of course are not made so deep as to interfere with the formation of a complete union of the surfaces, for otherwise the weld will be intermittent, only the opposite crossed ridges or contacting points being joined. Customarily, I space the grooves or slots differently on the opposite edges, say 20 or 22 grooves or slots to the inch on one edge and 28 or 30 on the other in butt-welding 18 and 20 gauge stock, and ordinarily I form straight slots at about 45° to the plane of the stock, although straight slots are not essential; at lesser angles (say 30° to the plane of the stock and less), I have experienced some tendency for straight-slotted rolls to split the edges of such stock. I have also found that for butt-welding it is desirable that the stock be rolled to width; that is to say, that after the stock is sheared it should again be rolled in order to flatten the marginal portions, thus producing flat or plane stock which can best withstand the serrating pressure without tendency to curl or deform the margins of the stock. Also, that small rather than large diameter serrating rolls are preferable because they have less tendency to curl the margins. Curled margins or edges of the stock in butt-welding produce a weld which is depressed below the plane face of the metal. However, rolling the stock to width is not essential, and it is not necessary to use extremely small treating rolls inasmuch as a depressed seam may be acceptable for certain purposes, and furthermore, the depression may be corrected by working the weld in a subsequent operation, such as by rapid hammering or by passing the seam between compression rolls immediately following and while still hot from the welding. Such subsequent treatment of the seam also tends to remove any markings on the surface of the product due to the serrating which may otherwise remain, and in general improves the product both in appearance and for the reception of paint, enamel and plating.

The invention is illustrated diagrammatically in the accompanying drawings, as applied to tube welding.

Fig. 1 is a diagrammatic side view of the essential elements of a tube welding machine with my invention applied thereto.

Fig. 2 is a sectional elevation of a detail of the machine at the serrating or nurling tools.

Fig. 3 is a perspective of a tube partly welded and partly unwelded, the unwelded portion being laid open and enlarged or exaggerated, to show the relations of the slots or ridges to each other on the two sides of the seam.

Fig. 4 is a diagrammatic illustration of the welding electrodes and the welding transformer, and the electrical connections.

Fig. 5 is a detail partly in section of the seam compressing rolls at the rear of the welding throat in Fig. 1.

Fig. 6 is a plan, and

Fig. 7 a sectional elevation of a modification of a detail adjacent the serrating tools.

The welding machine illustrated is of the so-called continuous type. The skelp or stock or narrow strip 1 of metal of the proper width to make the diameter of tube desired, is drawn from the reel 2 and through the forming rolls 3, horn 4, and forming rolls 5 constituting the forming mill which rolls up the stock into tube shape. Thence the formed stock passes into the welding throat constituted by the electrode rollers 8 and 9 and the support roller or rollers 10 which coact to compress the edges of the stock together in abutting relation (see Fig. 4). The welding transformer 11 furnishes the welding current (alternating current) at the requisite reduced voltage and high amperage to the electrode rolls 8 and 9 whence it passes across the seam and by the resistance of the seam provides the welding heat. From the welding throat the welded tube passes through the draft and shaping or sizing rolls 12 and leaves as finished tube. All or various of the forming and shaping rolls may be power driven as may be necessary and as will be understood, and the driven rolls propel the stock 1 through the machine. The electrode and support rolls are ordinarily turned by their frictional engagement with the moving stock 1. Also the various rolls may be assumed to be adjustably mounted as is customary, and usually some form of device is used about at 13 to assure the location of the seam midway between the electrode rolls, but has been omitted from the present drawings for lack of space. The drawings as so far described, may be regarded as a conventional representation of a tube welder, the essentials of which are well-known and hence need not be further described at present, although as hereinafter mentioned and described the machine illustrated embodies certain details which I regard as of co-operative importance to my invention.

In advance of the forming mill are located two nurling tools or wheels 19 and 20, one bearing on each edge of the flat stock 1 and leaving its impress on the edge as the stock is drawn over them. These need not be power driven but may be turned by reason of their engagement with the edges of the metal stock. They are similar in their form and cut to the tools or nurling wheels commonly used for nurling many articles, their slots or grooves being straight and at an angle of about 45° to their axes, so as to slot and ridge the edges of the stock at about 45° to the plane of the stock. Further, the tools are so arranged as to slot the two edges of the stock at opposite angles to each other, so that when the two edges are brought into contact as they approach the welding throat, the opposing ridges of the two edges cross each other and the initial contact is composed of one or more localized separated spots where opposite ridges cross each other. Customarily I have used nurling tools 19 and 20 of about three inches in diameter for 18 and 20 gauge steel stock, but I regard somewhat smaller tools to be preferable for the reason before given. Also as before pointed out, I customarily slot these nurling tools so that one leaves from 20 to 22 serrations to the inch in the edge of such stock and the other about 28 or 30 to the inch, the serrations being about 1/64th inch deep. I find that the forming mill tends to flatten the tops of the serrations somewhat in shaping up the stock into tube form.

For convenience in setting up or adjusting the machine, the milling or nurling tools 19 and 20 are made adjustable toward and from each other as indicated in Fig. 2; each tool bracket 23 is held to the main frame 24 of the machine by a bolt 25 passing through an elongated slot 26 and is held in place with the tool pressing firmly against the edge of the stock by a threaded member 27. To avoid the possibility that this adjustable feature of the milling tools may lead to getting the stock 1 out of proper alignment with the rolls 3 of the forming mill, etc., a guide member 28 with two vertical sides 29 (Fig. 1) permanently separated just far enough to permit the passage of the flat stock 1 between them may be applied to the machine in a suitable certain fixed position to properly direct the stock into the forming mill. Also to avoid too rapid wear of the nurling tools, especially when the serrations are fine (many to the inch), the faces of the nurling tools may be made much wider than the thickness of the stock and provision made for moving the tools axially or for moving the stock back and forth across the tool faces as illustrated in Figs. 1 and 2 which show the stock passing between two eccentric rolls 34 and 35, the roll 35 being arranged to push the stock bodily to one extreme of the working face of the tools (Fig. 2) while the roll 34 is arranged to push the stock to the opposite edge of the working face. The angular relation of these eccentric rolls is illustrated and their joint action is to move the stock 1 continually back and forth from one edge of the working face of the tools to the other as the stock passes through the machine and is being welded. They may be suitably driven by power from any source.

Immediately behind the welding throat is a rolling mechanism to work the welded seam while still hot from the welding, to correct any depression of the seam due to the curling of the stock edges and generally improve the appearance of the seam, etc. The details of this rolling mechanism are shown in Fig. 5. Bearing on the seam at the outside of the tube is a roll 40 and on the opposite side of the tube is provided a pair of spaced support rolls 41 and 42. Usually the faces of all three of these rolls are concaved so as to fit and somewhat embrace the tube as indicated. Within the tube is a roll 43 which has a convex working face to fit the interior curve of the tube, and which is supported in the frame 44 and bears against the seam opposite the roll 40. In turn the frame is supported by a roll 45 which runs on the interior wall of the tube immediately opposite the roll 41 and a similar roll 46 placed opposite the roll 42, and is held in position by a rod 47 projecting forward through the tube to a bracket or support located at a suitable place adjacent the forming mill where it can enter the unformed or partly formed tube, say, at the point 48 just in advance of the horn 4 (Fig. 1), as will be understood. By means of the rolls 40 and 43 the hot weld is squeezed and worked to the end indicated.

Customarily I have used a wide angular spacing between the electrode rolls with my invention as illustrated, where it will be seen (Fig. 4) each electrode is set at an angle of 45° from the vertical. The electrodes per se illustrated comprise only half of the rolling bodies shown for example in Fig. 4, that is to say, the disc portion $8^a$ is a good electrical conductor, customarily copper, which is electrically connected to the secondary winding of the welding transformer 11. The remainder of the rolling structure 8 comprises another disc $8^c$ which may be of electrically insulating material or of metal, but in the latter case this disc $8^b$ is insulated from the conducting disc $8^a$ and all connection with the welding transformer as represented by the layer of insulation 53. The discs $8^a$ and $8^b$ are mechanically connected together. The rolling structure 9 is similarly constructed, comprising a conducting disc $9^a$ and an insulating or insulated disc $9^b$ completing the structure. The current therefore enters and leaves the tube entirely through the conducting discs $8^a$ and $9^a$, and for electrical purposes these two discs constitute the whole of the electrodes, the discs $8^b$ and $9^b$ acting merely as supports for the tube and assisting in causing the electrodes to turn without slipping on the tube as the tube moves along. Obviously the two electrode discs may be made as thick or as thin (i. e., span as much or as little of the tube circumference) as desired, and without regard to the total thickness of the rolling structures 8 or 9. This electrode construction as a matter of general application to welding machines is the subject of a separate application for patent. It is obvious that my present invention is not limited to it.

Figs. 6 and 7 illustrate another arrangement for continually carrying the stock 1 back and forth across the faces of the serrating tools 19 and 20. As before, these tools are located at the edges of the stock 1 and are shown adjustable to and from the stock. Substantially in the plane of the axes of these tools is provided a plate 54 over and in contact with which the stock 1 tends to run. From this plate a connecting rod 55 extends to a crank movement as indicated at 56, so that as the crank shaft 57 is rotated by any suitable power source, the plate 54 is alternately raised (in Fig. 8) to a position where the stock 1 is adjacent one edge of the serrating tools 19 and 20, and depressed to a lower position where the stock 1 is adjacent the opposite edges of the faces of the tools. That is to say, rotation of the shaft 57 continually carries the stock back and forth across the faces of the milling tools in the same manner as the eccentric rolls 34 and 35 as previously described. To assure the descent of the stock 1 with the descent of the plate 54, a plate 58 similar to the plate 54, may be placed on the opposite face of the stock 1, and by any suitable means, gravity or otherwise, can be made to push the stock 1 down as the plate 54 descends. For example, the plate 58 may be connected by arms 59 to two hinged plates 60, hinged at opposite sides of the stock 1 as indicated in Fig. 6.

The "setting up" or adjustment of the welding machine illustrated, with my invention applied, and its operation, are quite like the "setting up" and operation of prior tube welders, except as modified by the added mechanism of my invention referred to, and need not be described.

It will be understood that my invention is not limited to the details of construction and operation hereinbefore described except as appears hereinafter in the claims.

I claim:

1. In an electric butt-welding machine, the combination with the electrodes and means for causing the stock to travel therebetween, of a nurling tool to serrate an edge of the stock as the latter approaches the electrodes, the width of the working face of said tool being greater than the thickness of the stock, and means for moving the stock and nurling tool relative to each other so that the stock crosses the face of said tool as the stock travels through the machine.

2. The subject of claim 1, characterized by the fact that said means moves the stock repeatedly back and forth across the face of the nurling tool.

In testimony whereof, I have signed this specification.

JOHN F. LAWSON.